US011065606B2

(12) United States Patent
Kubota et al.

(10) Patent No.: US 11,065,606 B2
(45) Date of Patent: Jul. 20, 2021

(54) METAL-SUBSTITUTED BETA ZEOLITE AND METHOD FOR PRODUCING SAME

(71) Applicants: Mitsui Mining & Smelting Co., Ltd., Tokyo (JP); NATIONAL UNIVERSITY CORPORATION TOTTORI UNIVERSITY, Tottori (JP); NATIONAL UNIVERSITY CORPORATION YOKOHAMA NATIONAL UNIVERSITY, Yokohama (JP)

(72) Inventors: Yoshihiro Kubota, Kanagawa (JP); Satoshi Inagaki, Kanagawa (JP); Naonobu Katada, Tottori (JP); Satoshi Suganuma, Tottori (JP); Yasuo Yamazaki, Tokyo (JP); Takahiro Kogawa, Saitama (JP)

(73) Assignees: Mitsui Mining & Smelting Co., Ltd., Tokyo (JP); NATIONAL UNIVERSITY CORPORATION TOTTORI UNIVERSITY, Tottori (JP); NATIONAL UNIVERSITY CORPORATION YOKOHAMA NATIONAL UNIVERSITY, Kanagawa (JP)

( * ) Notice: Subject to any disclaimer, the term of this patent is extended or adjusted under 35 U.S.C. 154(b) by 0 days.

(21) Appl. No.: 16/758,193

(22) PCT Filed: Oct. 25, 2018

(86) PCT No.: PCT/JP2018/039759
§ 371 (c)(1),
(2) Date: Apr. 22, 2020

(87) PCT Pub. No.: WO2019/082990
PCT Pub. Date: May 2, 2019

(65) Prior Publication Data
US 2020/0338539 A1 Oct. 29, 2020

(30) Foreign Application Priority Data
Oct. 25, 2017 (JP) .............................. JP2017-206108

(51) Int. Cl.
*B01J 29/76* (2006.01)
*B01J 37/30* (2006.01)
*C01B 39/46* (2006.01)
*C01B 39/02* (2006.01)
*B01J 29/72* (2006.01)
(Continued)

(52) U.S. Cl.
CPC ........... *B01J 29/7615* (2013.01); *B01J 29/72* (2013.01); *B01J 29/7215* (2013.01); *B01J 29/76* (2013.01); *B01J 37/30* (2013.01); *C01B 39/026* (2013.01); *C01B 39/46* (2013.01); *B01D 53/8628* (2013.01); *B01D 53/94* (2013.01); *B01D 2255/50* (2013.01); *B01D 2255/502* (2013.01); *B01D 2258/012* (2013.01); *B01J 2229/18* (2013.01); *B01J 2229/186* (2013.01); *B01J 2229/30* (2013.01); *B01J 2229/38* (2013.01); *Y02A 50/20* (2018.01); *Y02T 10/12* (2013.01)

(58) Field of Classification Search
CPC ........ B01J 29/76; B01J 29/7615; B01J 29/72; B01J 29/7215; B01J 2229/18; B01J 2229/38; B01J 2229/186; B01J 2229/30; B01J 37/30; C01B 39/026; C01B 39/46; Y02T 10/12; Y02A 50/20; B01D 53/94; B01D 53/8628; B01D 53/9418; B01D 2255/50; B01D 2255/502; B01D 2258/012
USPC ........................................ 502/60, 74, 85, 86
See application file for complete search history.

(56) References Cited

U.S. PATENT DOCUMENTS 4,908,136 A * 3/1990 Chou ..................... B01D 24/30
210/661
2011/0136657 A1 6/2011 Takamitsu et al.
2011/0286914 A1 11/2011 Li et al.
(Continued)

FOREIGN PATENT DOCUMENTS

EP 2974792 A1 1/2016
JP 2010-070450 A 4/2010
(Continued)

OTHER PUBLICATIONS

International Search Report (ISR) dated Dec. 11, 2019 filed in PCT/JP2018/039759.
(Continued)

*Primary Examiner* — Elizabeth D Wood
(74) *Attorney, Agent, or Firm* — Rankin, Hill & Clark LLP

(57) ABSTRACT

The purpose of the present invention is to provide a metal-substituted beta zeolite that exhibits a more excellent catalytic performance than conventional one, and a method for producing the same. The present invention provides a metal-substituted beta zeolite by subjecting an alkali metal-form beta zeolite produced without using an organic structure-directing agent to ion exchange with ammonium ion and then, using a filter cake procedure, to ion exchange with copper ion or iron(II) ion. The present invention also provides a metal-substituted beta zeolite which has been ion exchanged with copper ion or iron(II) ion and in which the amount of Lewis acid sites is greater than the amount of Bronsted acid sites when the amount of Bronsted acid sites and the amount of Lewis acid sites are measured by ammonia infrared-mass spectroscopy temperature-programmed desorption on the as-produced state.

8 Claims, 4 Drawing Sheets

(51) Int. Cl.
*B01D 53/86* (2006.01)
*B01D 53/94* (2006.01)

(56) References Cited

U.S. PATENT DOCUMENTS

| | | |
|---|---|---|
| 2012/0190534 A1 | 7/2012 | Itabashi et al. |
| 2014/0157987 A1 | 6/2014 | Ogura et al. |
| 2014/0322126 A1 | 10/2014 | Kubota et al. |
| 2017/0368539 A1 | 12/2017 | Kubota et al. |
| 2018/0022612 A1 | 1/2018 | Itabashi et al. |
| 2019/0054420 A1 | 2/2019 | Li et al. |

FOREIGN PATENT DOCUMENTS

| | | |
|---|---|---|
| JP | 2012-162446 A | 8/2012 |
| JP | 2013-526406 A | 6/2013 |
| JP | 2013-129590 A | 7/2013 |
| JP | 2014-172811 A | 9/2014 |
| JP | 2015-205277 A | 11/2015 |
| WO | 2011/013560 A1 | 2/2011 |
| WO | 2011/146615 A2 | 11/2011 |
| WO | 2016/129555 A1 | 8/2016 |

OTHER PUBLICATIONS

Blanch-Raga et al., "Cu and Co modified beta zeolite catalysts for the trichloroethylene oxidation", Applied Catalysis B: Environmental, Elsevier, 2016, vol. 187, pp. 90-97; Cited in EESR.

Zola et al: "Determination of the maximum retention of cobalt by ion exchange in h-zeolites", Brazilian Journal of Chemical Engineering, 2012, vol. 29, No. 2, pp. 385-392; Cited in EESR.

Extended European Search Report (EESR) dated Oct. 23, 2020 issued in the corresponding European Patent Application No. 18871344.0.

* cited by examiner (a)

(b)

TOTAL REACTION FORMULA : $NO+NO_2+2NH_3 \rightarrow 2N_2+3H_2O$

FIG. 2

EXAMPLE 1

(a) IN AS-PRODUCED STATE (b) AFTER FIRING AT 500°C FOR 1 HOUR

COMPARATIVE EXAMPLE 1

(a) IN AS-PRODUCED STATE (b) AFTER FIRING AT 500°C FOR 1 HOUR

METAL-SUBSTITUTED BETA ZEOLITE AND METHOD FOR PRODUCING SAME

TECHNICAL FIELD

The present invention relates to a copper ion- or iron ion-exchanged beta zeolite and to a method for producing the same.

BACKGROUND ART

Zeolites are widely used as catalysts for purifying exhaust gas from vehicles and so on. To remove nitrogen oxides, for example, an ammonia SCR process is widely used, in which a zeolite or the like carrying a transition metal such as copper or iron is used as a catalyst and ammonia is used as a reducing agent.

Zeolites are porous materials having regularly arranged micropores and a large surface area per unit mass. The micropores have sizes that allow gas-phase molecular sieving and thus make it possible to incorporate only relatively small molecules such as nitrogen oxides into the reaction field and to selectively remove large molecules such as hydrocarbons. The sizes of the micropores depend on the crystal structure of zeolite. Catalysts in practical use for purifying exhaust gas from internal combustion engines of automobiles and so on include small pore size zeolites including what are called CHA type, such as SSZ-13 and SAPO34; medium pore size zeolites including what are called MFI type; and large pore size zeolites including beta zeolites.

Zeolites have a skeleton composed of Si, Al, and O elements, in which negative charges are formed around bonded aluminum (Al) atoms. To cancel out the charges, cationic substances such as alkali metal ions, alkaline earth metal ions, transition metal ions, ammonium ions, or protons (hydrogen ions) can be coordinated as counter cations. For example, zeolites containing sodium, copper, or iron ions as counter cations may be called sodium-, copper-, or iron-type zeolites. Such counter cations are exchangeable so that an ion exchange function can be produced.

Zeolites are usually synthesized in the alkali metal form. Metal ion-substituted zeolites (copper- or iron-type zeolites) can be prepared by directly exchanging the alkali metal ions for copper or iron ions or by exchanging the alkali metal ions for ammonium ions and then exchanging the ammonium ions for copper or iron ions.

With an increase in the atomic Si/Al ratio (hereinafter also referred to as "SAR"), conventional beta zeolites can have enhanced resistance to water and heat. Such zeolites are advantageously employed as catalysts for purifying exhaust gas from internal combustion engines of vehicles and so on.

However, such high SAR leads to a reduced number of ion exchange sites so that the amount of a transition metal such as copper or iron cannot be increased in ion exchange, which results in the disadvantage of low activity. For this reason, the metal should be fixed by a certain method other than ion exchange, such as a method of depositing the transition metal. In such a case, the metal atoms can gradually aggregate under high-temperature conditions to hinder the contact of gas molecules, which raises a problem such as loss of catalytic activity.

As a solution to this trade-off problem, an organic structure-directing agent (hereinafter also referred to as OSDA)-free method of producing beta zeolite has been found, which makes it possible to produce a beta zeolite having a low SAR, a high ion exchange capacity, and a stable crystalline structure (see Patent Document 1). Patent Document 2 discloses the evaluation of the SCR catalyst activity of a zeolite obtained by subjecting an OSDA-free beta zeolite to ion exchange with ammonium ions and then exchanging the ammonium ions for iron or copper ions.

Patent Document 1: Japanese Unexamined Patent Application, Publication No. 2013-129590
Patent Document 2: Japanese Unexamined Patent Application (Translation of PCT Application), Publication No. 2013-526406

DISCLOSURE OF THE INVENTION

Problems to be Solved by the Invention

However, in contrast to the OSDA-free beta zeolite produced by the method disclosed in Patent Document 1, the metal-substituted beta zeolite obtained by copper or iron ion exchange according to known methods has room for improvement in the catalytic performance for purifying exhaust gas under conditions where hydrothermal durability is required at 600° C. or higher for a long period of time. Patent Document 2 only discloses copper or iron ion exchange based on known methods.

Means for Solving the Problems

Accordingly, the present invention has been made to solve the above-mentioned various problems. The present invention provides a metal-substituted beta zeolite including a product produced by a process including: subjecting, to ion exchange with ammonium ions, a beta zeolite of an alkali metal type produced without using any OSDA; and then subjecting the zeolite to ion exchange with copper or iron(II) ions by a filter cake method.

The present invention also provides a metal-substituted beta zeolite having undergone ion exchange with copper ions and having a Lewis acid site amount larger than a Bronsted acid site amount when the Lewis acid site amount and the Bronsted acid site amount of the zeolite in an as-produced state are measured by an ammonia infrared-mass spectrometry/temperature-programmed desorption method (also referred to as "IRMS-TPD method").

The present invention also provides a method for producing a metal-substituted beta zeolite, comprising: exchanging, for ammonium ions, alkali metal ions in a beta zeolite of an alkali metal type produced without using any OSDA, so that an ammonium-substituted beta zeolite is obtained; and allowing a copper ion- or iron(II) ion-containing aqueous solution to pass through a cake of the ammonium-substituted beta zeolite to exchange ammonium ions in the ammonium-substituted beta zeolite for copper or iron(II) ions.

Effects of the Invention

The metal-substituted beta zeolite of the present invention is superior to conventional zeolites in catalytic performance for purifying exhaust gas. In particular, the metal-substituted beta zeolite of the present invention for exhaust gas is excellent in SCR catalyst activity under hydrothermal conditions. The method of the present invention for producing a metal-substituted beta zeolite makes it possible to produce the metal-substituted beta zeolite of the present invention by an industrially advantageous method.

BRIEF DESCRIPTION OF THE DRAWINGS

FIG. 1(b) is a schematic diagram showing a process of reaction of nitrogen oxides and ammonia in a high-temperature gas phase in the presence of copper(II) and copper(I) as catalysts to convert them into $N_2$ and $H_2O$;

FIGS. 2(a) and 2(b) are $^{27}$Al MAS NMR spectra measured for a zeolite obtained in Example 1;

PREFERRED MODE FOR CARRYING OUT THE INVENTION

Figure 1:
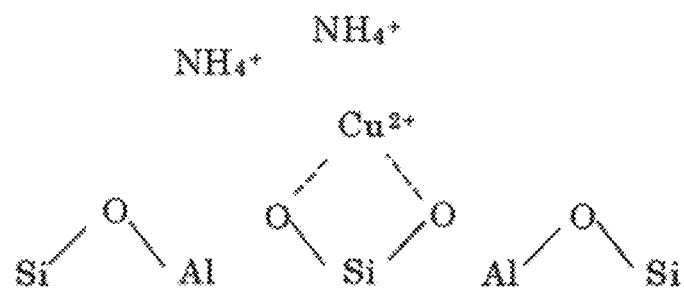
FIG. 1(*a*) is a schematic diagram showing a process of ion exchange between ammonium ions and copper(II) ions in water.
Figure 1:
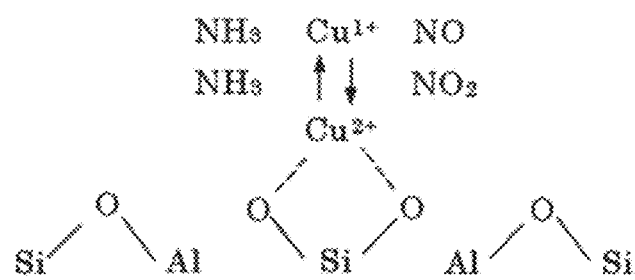

Hereinafter, preferred embodiments of the present invention will be described. First, a copper-substituted beta zeolite according to the present invention will be described. The inventors have conducted intensive research for copper-substituted beta zeolite compositions with high catalytic activity for exhaust gas purifying, and as a result, have found that it is important to increase the amount of copper ions available for contact with gas molecules per unit mass. As a result of further intensive research for such copper-substituted beta zeolite compositions, the inventors have found that a copper-substituted beta zeolite with its Lewis acid site amount larger than its Bronsted acid site amount has a high catalytic activity when the Lewis acid site amount and the Bronsted acid site amount are measured by an ammonia infrared-mass spectrometry/temperature-programmed desorption method.

Reasons behind the findings can be described as follows. The ammonia infrared-mass spectrometry/temperature-programmed desorption method allows the measurement of the Lewis acid site amount and Bronsted acid site amount of a zeolite from the behavior of ammonia adsorption on the zeolite. When ammonia is brought into contact with a copper-substituted beta zeolite in the ammonia infrared-mass spectrometry/temperature-programmed desorption method, the ammonia coordinates with the copper ions so that the copper ions, which can contact with gas molecules, function as Lewis acids for the ammonia, while the copper ions do not form Bronsted acid sites. This suggests that the Lewis acid site amount measured by the ammonia infrared-mass spectrometry/temperature-programmed desorption method may reflect the amount of copper ions available for contact with gas molecules. The amount of copper ions available for contact with gas molecules will reflect the amount of catalytically active sites. On the other hand, Bronsted acid sites in the copper-substituted beta zeolite may represent the amount of ion exchange sites that remain unsubstituted, for example, after substitution with copper ions. For example, when copper ions are introduced into an ammonium-type zeolite by copper ion exchange to form a copper-substituted beta zeolite, any ammonium ions remaining in the copper-substituted beta zeolite can produce Bronsted acid sites after heating in which the counter cations are converted into a proton (hydrogen) form.

Therefore, when the copper-substituted beta zeolite of the present invention is measured by the ammonia infrared-mass spectrometry/temperature-programmed desorption method, its Lewis acid site amount larger than its Bronsted acid site amount may be attributed to a smaller amount of ions remaining unsubstituted after ion exchange and a larger amount of copper ions available for contact with gas molecules.

The amount of Bronsted acid sites and the amount of Lewis acid sites are measured for the copper-substituted beta zeolite in the as-produced state. The term "as-produced" refers to a state or condition where the zeolite after its production remains with a water content of 10% by volume or more without being heated at 600° C. or higher for 10 hours or more. In this context, the term "heating" does not include any heating process during the measurement by the ammonia infrared-mass spectrometry/temperature-programmed desorption method, such as a heating process that includes rising temperature to 823 K and then holding temperature for 1 hour as shown below in the EXAMPLES section.

For enhancement in the catalytic activity of the beta zeolite, the total of the Bronsted acid site amount and Lewis acid site amount of 1 kg of the copper-substituted beta zeolite in the as-produced state is preferably 0.5 mol or more, more preferably 2 mol or more, in particular preferably 2.2 mol or more. In addition, for easiness of producing the beta zeolite, the total of the Bronsted acid site amount and Lewis acid site amount of 1 kg of the copper-substituted beta zeolite is preferably 3.5 mol or less.

Moreover, for further enhancement in the catalytic activity of the beta zeolite, L/B is preferably 1.5 or more, in which L represents the Lewis acid site amount of 1 kg of the copper-substituted beta zeolite in the as-produced state, and B represents the Bronsted acid site amount of 1 kg of the copper-substituted beta zeolite in the as-produced state. The upper limit of L/B may be, but not limited to, about 4.0, which may be highly effective in enhancing the catalytic activity in a satisfactory manner.

In an embodiment, for example, the Bronsted acid site amount of 1 kg of the copper-substituted beta zeolite in the as-produced state is preferably, but not limited to, 0.1 mol to 1.2 mol, more preferably 0.2 mol to 1.0 mol. In an embodiment, the Lewis acid site amount of 1 kg of the copper-substituted beta zeolite in the as-produced state is preferably 1.5 mol to 2.5 mol.

The Bronsted acid site amount and the Lewis acid site amount may be measured by the method described below in the EXAMPLES section. A preferred production method as described below may be used to produce the copper-substituted beta zeolite with its Lewis acid site amount larger than its Bronsted acid site amount and with its Bronsted acid site amount and its Lewis acid site amount falling within the above ranges.

Furthermore, for further enhancement in the catalytic activity, the copper-substituted beta zeolite of an embodiment preferably has substantially no peak derived from hexacoordinated Al when subjected to $^{27}$Al MAS NMR spectroscopy at 600 MHz.

Aluminum atoms in zeolite solids are known to include those inside the skeleton, which form Si—O—Al covalent bonds, and those outside the skeleton, which do not form Si—O—Al bonds. Among them, aluminum atoms inside the skeleton develop an ion exchange function. The state of coordination of aluminum can be analyzed by $^{27}$Al MAS NMR. In general, tetracoordinated aluminum atoms lie inside the skeleton, while hexacoordinated aluminum atoms lie outside the skeleton. The higher the number of aluminum atoms inside the skeleton, the higher the ion exchange capacity, so that 1 mole of monovalent cations can be ion-exchanged with 1 mole of aluminum. In an embodiment, substantially no observation of any peak derived from hexacoordinated Al in the $^{27}$Al MAS NMR spectroscopy at 600 MHz means that there are no or very few aluminum atoms outside the skeleton.

Specifically, "substantially no observation of any peak derived from hexacoordinated Al" in the $^{27}$Al MAS NMR spectroscopy at 600 MHz means that the ratio of the intensity of the peak derived from tetracoordinated aluminum to the intensity of the peak derived from hexacoordinated aluminum is equal to or higher than a certain value. When the copper-substituted beta zeolite of an embodiment is subjected to $^{27}$Al MAS NMR spectroscopy at 600 MHZ, for example, Y/X is preferably 15 or more, in which X represents the intensity of a main peak among the peaks derived from hexacoordinated aluminum and Y represents the intensity of a main peak among the peaks derived from tetracoordinated aluminum. Y/X is more preferably 30 or more, in particular preferably 50 or more. In this regard, the intensity ratio may be the ratio between peak heights in an NMR chart for the sake of convenience. The main peak may be a peak with the highest intensity (largest peak height). While larger Y/X is preferred, Y/X may preferably have an upper limit of about 1,000 for easiness of producing the copper-substituted beta zeolite. Most preferably, the copper-substituted beta zeolite of an embodiment is such that as peaks derived from aluminum in a $^{27}$Al MAS NMR chart, only peaks derived from tetracoordinated aluminum are observed while no peaks derived from hexacoordinated aluminum are observed.

In a $^{27}$Al MAS NMR chart, for example, peaks derived from tetracoordinated aluminum and hexacoordinated aluminum are respectively observed at 52 to 57 ppm and at 0 to 3 ppm, when an aqueous solution of 1,000 ppm aluminum nitrate is used as a reference.

The $^{27}$Al MAS NMR may be measured after the produced copper-substituted beta zeolite is fired at 500° C. for 1 hour in an air atmosphere or hydrothermally treated at 700° C. for 20 hours. It is not clear why the copper-substituted beta zeolite with substantially no hexacoordinated-Al-derived peaks observed under such conditions has a high catalytic activity. The inventors conclude that the copper-substituted beta zeolite of an embodiment can be highly resistant to heat so that aluminum atoms that lie inside the skeleton before firing can be prevented from moving outside the skeleton even after the firing or hydrothermal treatment. A preferred production method as described below may be used to produce the copper-substituted beta zeolite with substantially no hexacoordinated-Al-derived peaks observed in a 600 MHz $^{27}$Al MAS NMR chart.

Hereinafter, copper-substituted and iron-substituted beta zeolites according to the present invention will be further described.

The copper- or iron-substituted beta zeolite of the present invention preferably has a higher content of copper or iron introduced at ion exchange sites formed by aluminum atoms in the zeolite, which reflects introduction of a larger number of copper or iron ions available for contact with gas molecules. From this viewpoint, the copper- or iron-substituted beta zeolite preferably has an M/Al molar ratio of 0.3 or more, more preferably 0.35 or more, most preferably 0.45 or more. Here, M is Cu or Fe. With such a high M/Al molar ratio, the metal-substituted beta zeolite can be more useful for various catalysts. The upper limit of the M/Al molar ratio is preferably, but not limited to, 1 or less.

For further enhancement in the catalytic activity of the metal-substituted beta zeolite, the beta zeolite preferably has a high metal M content. For example, the content of metal M in the metal-substituted beta zeolite is preferably 2.5% by mass or more. For example, the content of metal M in the beta zeolite preferably has an upper limit of about 5% by mass, and sufficiently high performance can be achieved even if the content is not higher than that.

Moreover, for further enhancement in the catalytic activity of the copper-substituted beta zeolite, the content of Al in the beta zeolite is preferably 3% by mass or more, more preferably 3.5% by mass or more. For example, the content of Al in the beta zeolite preferably has an upper limit of about 4.5% by mass, and sufficiently high performance can be achieved even if the content is not higher than that.

For further enhancement in the catalytic activity of the metal-substituted beta zeolite, the metal-substituted beta zeolite preferably has a Si/Al molar ratio of 8 or less, more preferably 6 or less, in particular preferably 5.8 or less. For example, the Si/Al molar ratio of the beta zeolite preferably has a lower limit of 4.2 or more.

Furthermore, the metal-substituted beta zeolite preferably has a Na content of 1% by mass or less.

The M/Al molar ratio, the Si/Al molar ratio, the Cu content, the Fe content, and the Al content may be measured by an ICP-AES method, for example, according to the method described below in the EXAMPLES section.

For its catalytic activity, etc., the metal-substituted beta zeolite preferably has a micropore volume of 0.08 to 0.28 cm$^3$/g, more preferably 0.1 to 0.23 cm$^3$/g. The micropore volume may be measured, for example, by the method described below in the EXAMPLES section.

The metal-substituted beta zeolite of an embodiment is preferably synthesized without using any organic structure-directing agent (OSDA). The inventors believe that the metal-substituted beta zeolite of the present invention has high catalytic activity because of less defects. The term "synthesized without using any OSDA" specifically means that no OSDA is contained in the raw materials for its synthesis. Therefore, for example, even when a raw material includes a seed crystal produced using an OSDA, the OSDA can be removed by firing the seed crystal before use, and other raw materials can be free of any OSDA. The term "synthesized without using any OSDA" is intended to include such a case. The use of OSDA-free beta zeolites is also advantageous in terms of economy and environmental impact in that no OSDA is used. In particular, the zeolite of the present invention is preferably produced using neither any inorganic SDA nor any organic SDA.

Further, the metal-substituted beta zeolite of an embodiment is preferably produced by a process including: subjecting, to ion exchange with ammonium ions, a beta zeolite of an alkali metal type produced without using any OSDA; and then subjecting the zeolite to ion exchange with copper or iron(II) ions by a filter cake method. The inventors have found that in contrast to metal-substituted beta zeolites having undergone ion exchange with copper or iron(II) ions and produced without using any filter cake method, the metal-substituted beta zeolite with the above features has a larger Lewis acid site amount than its Bronsted acid site amount, has almost no Al atoms observed outside the skeleton in the NMR measurement after heating, and has high hydrothermal resistance and high catalytic activity, specifically, high SCR catalyst activity. While the description shows preferred structures and properties according to embodiments as much as possible, there are circumstances where it takes unduly high cost and long period of time and thus is impossible to determine further structures and properties of the metal-substituted beta zeolite. In light of the nature of patent application, such as the need for prompt filing, the description discloses preferred features of the metal-substituted beta zeolite of the present invention as shown above, as well as shows that the present invention is directed to a copper-substituted beta zeolite produced by a process including: subjecting, to ion exchange with ammonium ions, a beta zeolite of an alkali metal type produced without using any OSDA; and then subjecting the zeolite to ion exchange with copper or iron(II) ions by a filter cake method.

The term "filter cake method" refers to a process in which an ion exchange solution is allowed to pass through a cake of a beta zeolite to be subjected to ion exchange. The cake of the beta zeolite is a solid in a wet state, which may be obtained by suspending a beta zeolite in a liquid such as water, pouring the suspension on a filter plate, and removing the liquid fraction by filtration so that the solid fraction is allowed to remain on the filter plate. In the process of forming the cake, the liquid is preferably sucked when the liquid fraction is filtered and when the ion exchange solution is allowed to pass through the cake.

Hereinafter, a preferred method for producing the metal-substituted beta zeolite of the present invention will be further described. The present production method includes exchanging, for ammonium ions, alkali metal ions in a beta zeolite of an alkali metal type produced without using any OSDA, so that an ammonium-substituted beta zeolite is obtained; and allowing a copper ion- or iron(II) ion-containing aqueous solution to pass through a cake of the ammonium-substituted beta zeolite to exchange ammonium ions in the ammonium-substituted beta zeolite for copper or iron(II) ions. In the present production method, copper or iron(II) can be introduced with a very high efficiency into the cation exchange sites of the beta zeolite having undergone ion exchange with ammonium ions, which makes it possible to obtain a metal-substituted beta zeolite having high heat resistance, especially, high hydrothermal resistance, and high catalytic activity.

The beta zeolite as a raw material usually contains alkali metals such as sodium. The alkali metal-containing beta zeolite is converted into an ammonium-type beta zeolite by ion exchange for removal of the alkali metal, because it cannot well provide the desired performance when used as a catalyst in the petrochemical industry or as a catalyst for purifying exhaust gas from internal combustion engines.

The method disclosed in WO 2011/013560 may be used to synthesize the OSDA-free beta zeolite. The method disclosed in Chinese Patent Application Publication No. 101249968 A may also be used. In addition, the method described in Chemistry of Materials, Vol. 20, No. 14, pp. 4533-4535 (2008) may be used.

An example of a method for synthesizing the OSDA-free beta zeolite includes:
(i) mixing a silica source, an alumina source, an alkali source, and water to form a reactant mixture having a composition represented by the following molar ratios:
$SiO_2/Al_2O_3$=40 to 200, particularly, 44 to 200;
$Na_2O/SiO_2$=0.22 to 0.4, particularly, 0.24 to 0.35;
$H_2O/SiO_2$=10 to 50, particularly, 15 to 25;
(ii) adding 0.1 to 20% by mass of a seed crystal of a beta zeolite to the reactant mixture based on the mass of the silica component in the reactant mixture, in which the beta zeolite has a $SiO_2/Al_2O_3$ ratio of 8 to 30 and a mean particle size of 150 nm or more, specifically 150 to 1,000 nm, in particular 200 to 600 nm and is free of any organic compound; and
(iii) heating the seed crystal-containing reactant mixture at 100 to 200° C., in particular 120 to 180° C. in a hermetic system.

An ammonium compound may be used for the ion exchange of the raw material beta zeolite with ammonium ions. In particular, ammonium nitrate, ammonium chloride, ammonium acetate, ammonium sulfate, or ammonium carbonate is preferably used. When ion exchange is performed with an ammonium compound such as ammonium nitrate, ammonium chloride, or ammonium carbonate, the pH of the aqueous solution of the compound is preferably 6.5 to 7.5. The ion exchange may be performed under conditions where the ammonium ion-containing aqueous solution is heated or not heated. Any method capable of bringing the raw material beta zeolite in contact with ammonium ions may be used for the ion exchange of the raw material beta zeolite with ammonium ions. Preferably, a filter cake method is used, in which a cake of the raw material beta zeolite is formed by the above method and an ammonium ion-containing aqueous solution is allowed to pass through the cake, so that an ammonium ion-substituted beta zeolite can be obtained with a higher ammonium exchange efficiency.

Thereafter, the raw material beta zeolite is washed to give an ammonium-substituted beta zeolite. The ammonium-type beta zeolite has a greatly reduced alkali metal ion content.

Further, in the present production method, the ion exchange of the ammonium-substituted beta zeolite with copper or iron(II) ions is performed by a filter cake method. In other words, ammonium ions in the ammonium-substituted beta zeolite are exchanged for copper or iron(II) ions by allowing a copper ion- or iron(II) ion-containing aqueous solution to pass through the cake of the ammonium-substituted beta zeolite.

Examples of the copper ion source used to prepare the copper ion-containing aqueous solution to be allowed to pass through the cake include copper sulfate, copper acetate, copper nitrate, copper phosphate, copper chloride, and so on, of which copper sulfate, copper acetate, and copper chloride are preferred. The copper ion-containing aqueous solution preferably has a copper ion concentration of 0.01 mol/L or more and 0.3 mol/L or less, more preferably 0.03 mol/L or more and 0.2 mol/L or less. The volume of the solution allowed to pass through is preferably 0.05 L to 0.15 L, more preferably 0.08 L to 0.1 L based on 10 g of the zeolite. As will be described later, the copper ion-containing aqueous solution preferably has a pH of 3 to 6, in particular preferably 4 to 5.

Examples of the iron(II) ion source used to prepare the iron(II) ion-containing aqueous solution to be allowed to pass through the cake include iron(II) sulfate, iron(II) acetate, iron(II) nitrate, iron(II) phosphate, iron(II) chloride, and so on. The iron(II) ion concentration and the volume of the iron(II) ion-containing aqueous solution allowed to be pass through are preferably the same as the above copper ion concentration and the volume of the copper ion-containing aqueous solution allowed to be pass through. To obtain an iron-substituted beta zeolite having high catalytic activity, a compound that prevents oxidation of divalent iron to trivalent iron should be added to water in the preparation of the iron(II) ion-containing aqueous solution. Such a compound is preferably ascorbic acid, which is a compound that does not interfere with Fe(II) ion exchange and can prevent oxidation of Fe(II) ions to Fe(III) ions. The content of ascorbic acid in the iron(II) ion-containing aqueous solution is preferably 0.1 to 10 times, in particular preferably 0.5 to 8.5 times the number of moles of divalent iron to be added, in order to effectively prevent oxidation of divalent iron.

As mentioned above, the ammonium-substituted zeolite cake may be formed by preparing a slurry containing the ammonium-substituted zeolite suspended in a solvent such as water and filtering the slurry on a filter plate. In the case of iron ion exchange, the slurry preferably also contains ascorbic acid. The amount of ascorbic acid in the slurry is preferably 1 part by mass or more and 150 parts by mass or less based on 100 parts by mass of the ammonium-substituted zeolite in order to effectively prevent oxidation of divalent iron.

For an increase in the amount of the supported metal, the total amount of the solution allowed to pass through is preferably 0.5 to 1,000 mL, more preferably 1 to 100 mL, per 1 g of the zeolite. The amount of the solution allowed to pass through per 1 g and 1 minute is preferably 0.005 to 20 mL, more preferably 0.01 to 10 mL.

After the solution is allowed to pass through, the beta zeolite may be washed and then dried or baked to give a suitable metal-substituted beta zeolite.

The present production method allows a high content of copper or divalent iron to be supported on ion exchange sites in the zeolite and makes it possible to obtain a metal-substituted beta zeolite having Lewis acid sites more than Bronsted acid sites and having substantially no hexacoordinated-Al-derived peak observed when the zeolite is subjected to 27Al MAS NMR spectroscopy at 600 MHz. Although the reason for this is not clear, the inventors speculate as follows. While a model of copper ion exchange will be described below, the same may apply to iron ion exchange.

A method of ion-exchanging zeolite with copper ions includes, for example, placing a copper(II) ion-containing aqueous solution at a given concentration into a beaker, adding a given amount of alkali metal-type zeolite or ammonium-type zeolite into the beaker, bringing them into contact by stirring for a period as long as possible, and then separating the solid and the liquid by filtration or the like. The inventors have found that when this conventional method is used for the ion exchange, not all metal ions introduced are subjected to ion exchange. This may be because an ion exchange equilibrium is established as shown in formula (1).

[Math. 1]

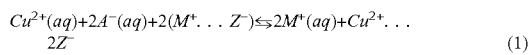

$$Cu^{2+}(aq)+2A^-(aq)+2(M^+\ldots Z^-)\rightleftarrows 2M^+(aq)+Cu^{2+}\ldots 2Z^- \quad (1)$$

(Here, $C^{2+}$ represents copper(II) ion, $A^-$ counter anion in a copper ion-containing aqueous solution, $M^+$ alkali metal or ammonium cation, $Z^-$ zeolite, and ... ionic bond, and (aq) indicates that the corresponding ion is present in an aqueous solution.)

The pH of the solution before and after the ion exchange is determined by the dissociation equilibrium between a copper salt ($CuA_2$) and the alkali metal or ammonium salt (MA) and water. Regardless of the type of anion such as acetic acid, sulfuric acid, or hydrochloric acid, the pH of the copper ion exchange solution will be lower than 5.5 and further decrease as the temperature increases. According to the Pourbaix diagram of copper, if the pH is higher than 5, copper hydroxide can be produced during stabilization of copper ions in the aqueous solution, so that the ammonium-type zeolite cannot be ion-exchanged with copper ions. According to the Pourbaix diagram of aluminum, if the pH is lower than 4, the aluminum in the zeolite may be eluted to the aqueous solution, so that the ion exchange capacity of the zeolite may decrease. Therefore, it is desirable to adjust the pH of the ion exchange solution to a narrow range of 4 to 5. As described above, the pH varies greatly depending on conditions such as the type and concentration of the anion and the amount of the zeolite. As used herein, the term "pH" refers to a value at 25° C.

If the copper ion-exchanged zeolite is added to an acidic aqueous solution, an equilibrium can also be established as shown in formula (2) in which copper is eluted according to the pH.

[Math. 2]

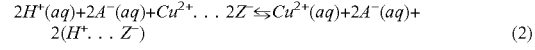

$$2H^+(aq)+2A^-(aq)+Cu^{2+}\ldots 2Z^- \rightleftarrows Cu^{2+}(aq)+2A^-(aq)+2(H^+\ldots Z^-) \quad (2)$$

(Here, $Cu^{2+}$, $A^-$, $Z^-$, and ... are as defined above, and $H^+$ represents proton (hydrogen ion).)

As described above, the conventional method in which zeolite is dispersed in a copper ion-containing aqueous solution has a problem in that it is difficult to increase the ion exchange rate in the complicated equilibrium relationship between the ion exchange equilibrium reaction and the copper elution equilibrium reaction.

In contrast, in the present production method, the ion exchange solution and the zeolite are brought into contact with each other for a relatively short period of time, which makes it easy to control the composition of the ion exchange solution. Eventually, the zeolite will be brought into contact with an alkali metal ion-free or ammonium cation-free ion exchange solution, so that the amount of supported copper or iron can be made substantially equal to the amount of ion exchange sites in the zeolite.

The present production method may be industrially implemented as a production method using a belt filter. A water suspension of a beta zeolite produced free of OSDA may be used to continuously form a cake with an appropriate thickness on a commercially available porous belt, which is in the form of a closed ring with both ends wound on rollers and is moved at a rate of several cm/sec. In a first zone, an ion exchange solution (ammonium ion-containing aqueous solution) containing ammonium chloride and ammonium carbonate dissolved in water and having a pH adjusted to 7 may be sprayed like a shower. The ion exchange solution may be appropriately removed from the lower part of the belt under vacuum. In a second zone, a copper ion- or iron(II) ion-containing aqueous solution may be used as an ion exchange solution and subjected to ion exchange in a similar manner. In a third zone, pure water may be sprayed like a shower for water washing to remove the excess ion exchange solution. Such a device makes it possible, for example, to produce copper-substituted beta zeolites for catalytic converters for automobiles on an industrial scale.

The metal-substituted beta zeolite obtained in this manner according to an embodiment is a promising candidate as a solid acid catalyst or an adsorbent, and more specifically, is a particularly promising candidate as a catalyst for catalytic cracking of paraffins, such as a catalyst for cracking of long-chain hydrocarbons, such as hexane, in the petrochemical industry, or a promising candidate as a hydrocarbon trap for purifying exhaust gas from various internal combustion engines such as gasoline engines and diesel engines.

The inventors speculate as follows as to why the metal-substituted beta zeolite of an embodiment can be particularly suitable as an SCR catalyst. While a model of the copper-substituted beta zeolite will be described below, the same may apply to the iron(II)-substituted beta zeolite. In general, when used as an SCR catalyst, a beta zeolite may work according to the mechanism shown in FIGS. 1(a) and 1(b). In the zeolite crystal structure, aluminum has a valence one lower than that of Si, and therefore, oxygen in the vicinity of aluminum is negatively charged, at which cation exchange is performed. As shown in FIG. 1(a), when copper ions supported on a zeolite through ion exchange are used for an SCR catalyst, the copper ions are reduced from Cu(II)

to Cu(I) by ammonia as shown in FIG. 1(b). The Cu(I) serves as a catalyst to increase the rate of the reaction of NO and $NO_2$ with $2NH_3$, and as a result, efficiently converts them into $N_2$ and $H_2O$. $NH_3$, which is supplied to reduce the nitrogen oxides, should be supplied in excess to some extent in order for the reaction to proceed. For efficient reduction of NO and $NO_2$, excess of $NH_3$ should be kept in the vicinity of the catalyst. The metal-substituted beta zeolite of an embodiment can hold substantially the same amount of copper as that of ion exchange sites in the zeolite and has a Lewis acid site amount larger than its Bronsted acid site amount, which suggests a large number of Cu atoms available for contact with gas molecules and thus suggests that efficient retention can be achieved by bonding between Cu and $NH_3$ to form a complex (apparently measured as a Lewis acid).

EXAMPLES

Hereinafter, the present invention will be described in more detail with reference to examples. It will be understood that the examples are not intended to limit the scope of the present invention. The analyzer and method shown below were used.

Composition analysis was performed using ICPS-7510 manufactured by Shimadzu Corporation.

The volume of micropores was determined as follows. Using BELSorpMAX manufactured by MicrotracBEL Corp., pretreatment was performed under vacuum (reached pressure 2 Pa) at 300° C. for 1 h, and then nitrogen adsorption isotherm was measured at −196° C., from which a nitrogen adsorption capacity at a nitrogen pressure of 0.005 atm was determined using the following calculation formula.

Volume $(cm^3 g^{-1})$ of micropores=nitrogen adsorption capacity $(mol_{N2} g^{-1})$ at 0.005 atm×28.01 $(g_{N2} mol_{N2}^{-1})/0.808$ $(g_{LiqN2} cm^{-3})$

Preparation Example 1

(1) Synthesis of Seed Crystals

According to a conventionally known method, tetraethylammonium hydroxide as an OSDA, sodium aluminate as an alumina source, and silica fine powder (Mizukasil P707) as a silica source were heated with stirring at 165° C. for 96 hours to form a beta zeolite with a $SiO_2/Al_2O_3$ molar ratio of 24.0. In an electric oven through which air was circulated, the product was fired at 550° C. for 10 hours to form OSDA-free crystals. As a result of observation with a scanning electron microscope, the crystals had a mean particle size of 280 nm. The resulting organic-free beta zeolite crystals were used as seed crystals.

(2) Synthesis of OSDA-Free Beta Zeolite

In 13.9 g of pure water were dissolved 0.235 g of sodium aluminate and 1.828 g of 36% by mass sodium hydroxide to form an aqueous solution. A mixture of 2.024 g of silica fine powder (Cab-O-sil, M-5) and 0.202 g of the seed crystals was added little by little to the aqueous solution and stirred to form a reactant mixture. The reactant mixture had a $SiO_2/Al_2O_3$ molar ratio of 70, a $Na_2O/SiO_2$ molar ratio of 0.3, and a $H_2O/SiO_2$ molar ratio of 20. The reactant mixture was placed in a 60 mL stainless steel closed vessel and statically heated at 140° C. for 34 hours under autogenous pressure without aging and stirring. After the closed vessel was cooled, the product was collected by filtration and washed with warm water to give a white powder. The product was subjected to X-ray diffraction measurement and as a result, determined to be an impurity-free beta zeolite. Composition analysis showed that the product had a Si/Al molar ratio of 6.4.

Example 1

(1) Preparation of Ammonium-Substituted Zeolite

The sodium-type OSDA-free beta zeolite obtained in Preparation Example 1 was sampled in an amount of 1,400 g and suspended in 8,500 mL of water at 60° C. The suspension was poured on 5C filter paper placed on a 330 mm diameter Nutsche with its bottom connected to a vacuum bottle, so that a zeolite cake was formed with a thickness of about 2 cm. Next, ammonium chloride and ammonium carbonate were dissolved in water to form an ion exchange solution with an adjusted pH of 7. The ion exchange solution at 40° C. was poured on the zeolite cake and then removed from the bottom under vacuum. This process was repeated five times. The ion exchange solution was then heated to 60° C. and poured on the zeolite cake to wash off the excess solute. The degree of cleanliness was monitored by measuring the pH and electrical conductivity of the washed-out solution, and the washing was continued until predetermined values (pH 7 and 30 pS/m) were reached.

(2) Preparation of Copper-Substituted Zeolite

The ammonium-substituted zeolite obtained in (1) was sampled in an amount of 271 g and suspended in 2,433 mL of water. The suspension was poured on 5C filter paper placed on a 165 mm diameter Nutsche with its bottom connected to a vacuum bottle, so that a zeolite cake was formed with a thickness of about 2 cm. Next, copper(II) sulfate was dissolved in water to form a copper(II) ion exchange solution (pH 4) with an adjusted copper ion concentration of 0.1 mol/L, and 2,572 mL of the copper(II) ion exchange solution was divided into four aliquots. One (643 mL) of the aliquots was poured on the zeolite cake and then removed from the bottom under vacuum. This process was repeated four times. The degree of vacuum was adjusted so that it took about 10 to 30 minutes to complete one removal process. Pure water was then poured on the zeolite cake to wash off the excess solute. The degree of cleanliness was monitored by measuring the pH and electrical conductivity of the washed-out solution, and the washing was continued until predetermined values (pH 7 and 30 μS/m) were reached. The cake was taken out and dried at 100° C. for 4 hours to give a copper-substituted beta zeolite of Example 1. The resulting copper-substituted beta zeolite was subjected to composition analysis and measurement of micropore volume, Bronsted acid site amount, and Lewis acid site amount. Table 1 shows the results of the analysis and measurement. Table 1 also shows the results of the composition analysis and measurement of acid site amount of the beta zeolite after the ammonium ion exchange and before the copper ion exchange. The Bronsted acid site amount and the Lewis acid site amount were measured by the method described below. As shown in Table 1, the copper ion-exchanged beta zeolite of Example 1 had its Lewis acid site amount larger than its Bronsted acid site amount, and had a L/B ratio of 2.19 (=2.11/0.96), in which L represents the Lewis acid site amount of 1 kg of the copper-substituted beta zeolite and B represents the Bronsted acid site amount of 1 kg of the copper-substituted beta zeolite.

TABLE 1

| | | Example 1 (Before Copper Substitution) | Example 1 | Example 2 | Comparative Example 1 | Comparative Example 2 |
|---|---|---|---|---|---|---|
| Volume of Micropores | ml/g | 0.2665 | 0.2113 | 0.1600 | 0.2317 | 0.2430 |
| Si/Al Molar Ratio | — | — | 4.87 | 5.1 | 5.46 | 4.89 | 5.1 |
| Bronsted Acid Site Amount | mol/kg | 1.23 | 0.96 | 0.69 | 1.73 | 1.36 |
| Lewis Acid Site Amount | mol/kg | 0.18 | 2.11 | 2.07 | 0.38 | 0.42 |
| Cu Content | % by Mass | 0 | 4.52 | 4.39 | 2.70 | 1.8 |
| Cu/Al Molar Ratio | — | 0 | 0.49 | 0.49 | 0.21 | 0.212 |
| Na Content | % by Mass | 0.4 | N.D. | 0.01 | N.D. | N.D. |
| Al Content | % by Mass | 4.12 | 3.94 | 3.8 | 3.81 | 3.61 |

<Bronsted Acid Site Amount and Lewis Acid Site Amount>

The Bronsted acid site amount and Lewis acid site amount of the copper-substituted beta zeolites obtained in Example 1 were measured by the ammonia infrared-mass spectrometry/temperature-programmed desorption method according to Naonobu Katada, Yusuke Kawaguchi, Kazuki Takeda, Taku Matsuoka, Naoki Uozumi, Kazuki Kanai, Shohei Fujiwara, Keisuke Kinugasa, Koshiro Nakamura, Satoshi Suganuma and Masato Nanjo, Appl. Catal., A: Gen., Vol. 530, pp. 93-101 (2017). Specifically, about 10 mg of the zeolite was ground in an agate mortar, and the ground zeolite was sandwiched between mirror plates in a metal cylinder with a diameter of 10 mm and then compression-molded into a 10 mm diameter disk under application of a pressure of about 20 MPa. The zeolite disk was placed in a mesh sample holder of IRMS-TPD System manufactured by Microtrac-BEL Corp. While a gas mixture with a molar ratio of oxygen to nitrogen of 6.3/93.7 was circulated at a flow rate of 34 $\mu mol \cdot min^{-1}$ through the system, the temperature was raised to 823 K and kept at 823 K for 1 h. At 823 K, vacuum evacuation was performed for 10 min. While the vacuum was kept, the temperature was lowered to 343 K, and then helium was circulated at a flow rate of 82 $\mu mol \cdot min^{-1}$ through the system. While the pressure in the system was kept at 6.0 kPa by vacuum pump evacuation from the outlet, the temperature was raised at a rate of 2 $K \cdot min^{-1}$ to 803 K, during which an infrared spectrum was measured at a frequency of once per temperature rise of 1 K. Subsequently, the temperature was lowered to 343 K while the helium was circulated. After the deaeration, ammonia at 13 kPa was introduced at 343 K for 30 min into the system. After deaeration for 180 min, helium was circulated at a flow rate of 82 $\mu mol \cdot min^{-1}$ through the system. While the pressure in the system was kept at 6.0 kPa by vacuum pump evacuation from the outlet, the temperature was raised at a rate of 2 $K \cdot min^{-1}$ to 803 K, during which an infrared spectrum was measured at a frequency of once per temperature rise of 1 K while a mass spectrum was constantly recorded. After the temperature rise was completed, an ammonia-helium gas mixture with a known concentration was circulated through the system. On the basis of the response of the mass spectrometer in this step, the mass spectrum was used to calculate the concentration of gas-phase ammonia. A function M(T) was obtained by plotting the concentrations of gas-phase ammonia against temperature. In the function, T represents temperature. After completion of the measurement, the sample was taken out and weighed. On the other hand, a differential infrared spectrum was obtained by plotting, against wave number, results obtained by subtracting each infrared absorbance before ammonia adsorption from each infrared absorbance at each infrared wave number after ammonia adsorption. A function L(T) was obtained by plotting, against temperature, results obtained by multiplying, by −1, values obtained by differentiating peak areas appearing at 1,260 to 1,330 $cm^{-1}$ by temperature. A function B(T) was obtained by plotting, against temperature, results obtained by multiplying, by −1, values obtained by differentiating peak areas appearing at 1,420 to 1,500 $cm^{-1}$ by temperature. In the following equation, x and y are selected by trial and error so that z is the minimum.

$$z = \sum_{T=343K}^{803K} \{xL(T) + yB(T) - M(T)\}^2 \quad [\text{Math. 3}]$$

The obtained xL(T) is an ammonia TPD profile for Lewis acid sites, and the yB(T) is an ammonia TPD profile for Bronsted acid sites. The Lewis acid site amount and the Bronsted acid site amount were determined by the following formulae.

$$\text{Lewis Acid Site Amount} = \frac{Fx \sum_{T=343K}^{803K} L(T)\Delta T}{W} \quad [\text{Math. 4}]$$

$$\text{and Bronsted Acid Site Amount} = \frac{Fy \sum_{T=343K}^{803K} B(T)\Delta T}{W}$$

Here, F is the volume flow rate of helium during measurement (34 $cm^3 s^{-1}$ in this measurement), and W is the mass of the sample, and $\Delta T$ is the interval between infrared spectrum measurements (1 K in this measurement).

<$^{27}$Al MAS NMR>

The copper-substituted beta zeolite of Example 1 was fired at 500° C. for 1 hour in an air atmosphere (fired product). The firing was carried out in a muffle furnace by raising the temperature from room temperature to 500° C. at 2° C./min, then holding the temperature for 1 hour, and then lowering the temperature before taking out. The $^{27}$Al MAS NMR (magic angle spinning nuclear magnetic resonance) spectra of the unfired zeolite and the fired zeolite were measured by the method described below. The measurement system used was AVANCE III 600 manufactured by Bruker Corporation. The sample tube was filled with the sample (about 82 to 127 mg) and then introduced into the probe. Tuning was performed for the $^{27}$Al resonance frequency of 156.388 MHz corresponding to the $^1$H resonance frequency of 600.130 MHz. The sample tube was inclined by 54.73° (magic angle) with respect to the external magnetic field and spun at a high speed of 3 to 15 kHz. Radio wave pulses were applied to the sample tube, and the resulting FID (free induction decay) signal was Fourier-transformed to form an NMR spectrum. The repetition time and integration time were set to 0.5 sec and 10 min, respectively. The $^{27}$Al MAS NMR spectra of the copper-substituted beta zeolite sample are shown in FIGS. 2(a) and 2(b). FIGS. 2(a) and 2(b) show the spectra of the sample in the unfired state (the as-produced state) and in the fired state, respectively. In both states of the copper-substituted beta zeolite sample, only a single peak attributed to tetracoordinated Al was observed (chemical shift at about 55 to 56 ppm), and substantially no single peak attributed to hexacoordinated Al was observed (chemical shift at about 0 to 3 ppm). Specifically, the peak height ratio Y/X was infinite and 19.8 respectively in the unfired state and in the fired state, in which X is the height of a single peak attributed to hexacoordinated Al, and Y is the height of a single peak attributed to tetracoordinated Al.

Comparative Example 1

An OSDA-free beta zeolite was produced under the same conditions as those in Preparation Example 1 and then subjected to ammonium ion exchange under the same conditions as those in (1) of Example 1 to form an ammonium-substituted zeolite.

The ammonium-substituted zeolite was sampled in an amount of 29 g and suspended in 804 mL of water. To the suspension was added 20.61 g of copper sulfate so that a copper ion concentration of 0.1 mol/L was reached. The suspension was then stirred at 25° C. for 5 hours. In this process, the aqueous copper sulfate solution had a pH of 4. Next, the aqueous copper sulfate solution was poured on 5C filter paper placed on an 80 mm diameter Nutsche with its bottom connected to a vacuum bottle, so that a cupper-substituted zeolite cake was formed with a thickness of about 1 cm.

Pure water was then poured on the zeolite cake to wash off the excess solute. The degree of cleanliness was monitored by measuring the pH and electrical conductivity of the washed-out solution, and the washing was continued until predetermined values (pH 7 and 30 μS/m) were reached. The cake was taken out and dried under the same conditions as those in Example 1 to give a copper-substituted beta zeolite of Comparative Example 1. The resulting copper-substituted beta zeolite was subjected to composition analysis and acid site amount analysis. Table 1 shows the results of the analysis. As shown in Table 1, the copper ion-exchanged beta zeolite of Comparative Example 1 had a Lewis acid site amount lower than its Bronsted acid site amount.

Figure 3:
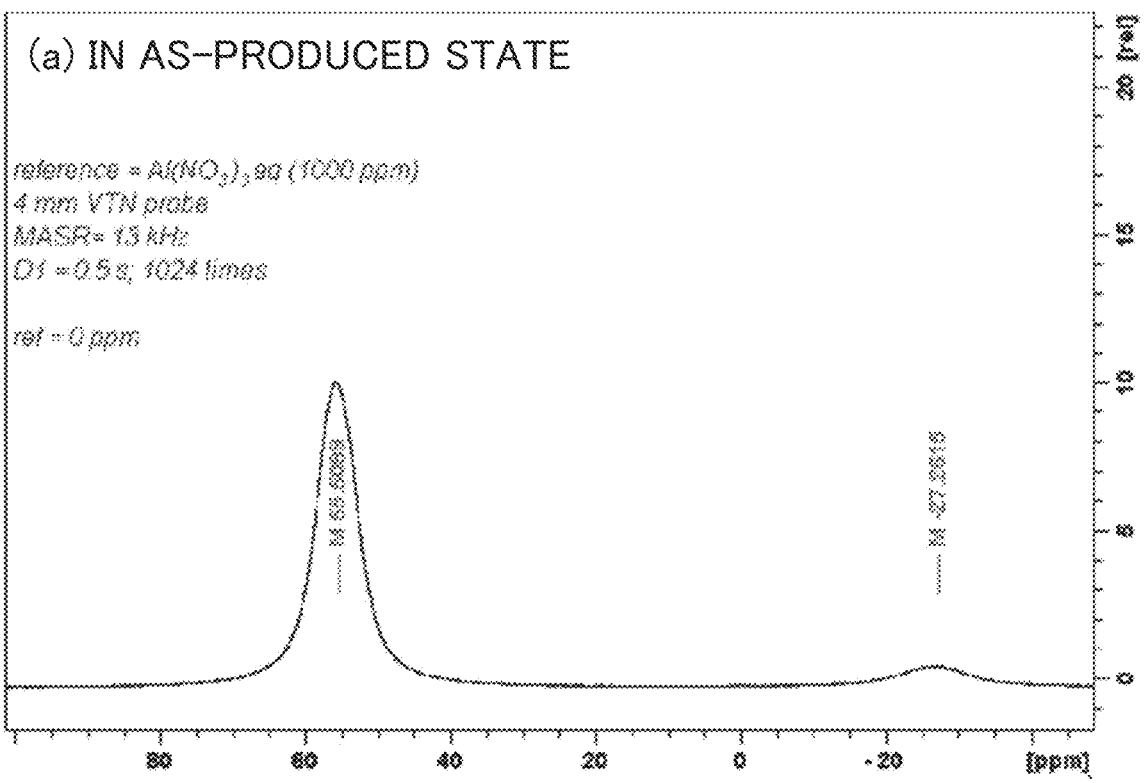
FIGS. 3(a) and 3(b) are $^{27}$Al MAS NMR spectra measured for a zeolite obtained in Comparative Example 1.
Figure 3:
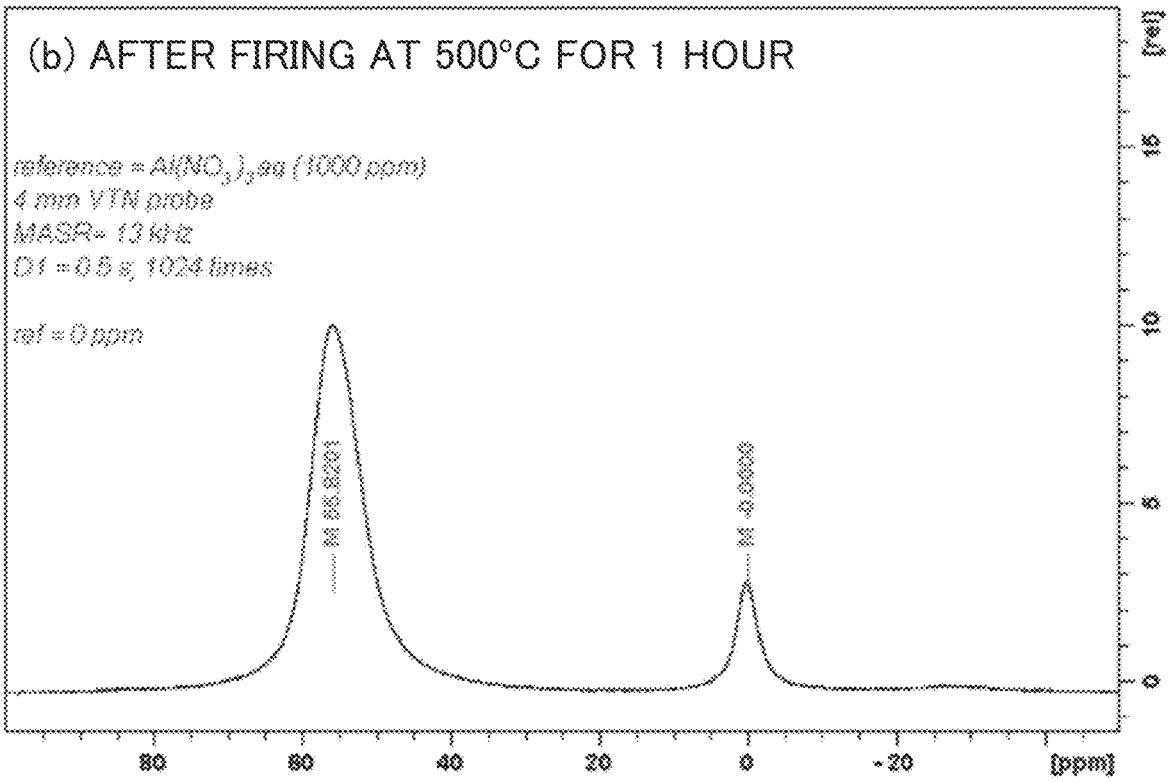

The copper-substituted beta zeolite of Comparative Example 1 was measured and evaluated in the same manner as in Example 1. FIG. 3 shows the results. As shown in FIG. 3(a), in the unfired state of the copper-substituted beta zeolite of Comparative Example 1, a single peak (chemical shift at 55.5099 ppm) attributed to tetracoordinated Al was observed, while substantially no single peak (chemical shift about 0 to 3 ppm) attributed to hexacoordinated Al was observed. As shown in FIG. 3(b), however, in the fired state, a single peak attributed to tetracoordinated Al and a single peak attributed to hexacoordinated Al were observed. Specifically, the peak height ratio Y/X was infinite and 3.3 respectively in the unfired state and in the fired state, in which X is the height of a single peak attributed to hexacoordinated Al, and Y is the height of a single peak attributed to tetracoordinated Al.

Example 2

A copper-substituted beta zeolite of Example 2 was obtained similarly to Example 1 except that copper(II) sulfate in Example 1 was changed to copper(II) acetate. As shown in Table 1, the copper-substituted beta zeolite of Example 2 was found to have a Lewis acid site amount larger than its Bronsted acid site amount, similarly to that of Example 1.

Comparative Example 2

A copper-substituted beta zeolite of Comparative Example 2 was obtained similarly to Comparative Example 1 except that copper(II) sulfate in Comparative Example 1 was changed to copper(II) acetate. As shown in Table 1, the zeolite of Comparative Example 2 was also found to have a Lewis acid site amount smaller than its Bronsted acid site amount.

Example 3

After 1,080 g of ascorbic acid was added to and dissolved in 5,360 mL of water, 1,074 g of the ammonium-substituted beta zeolite obtained in (1) of Example 1 was added thereto and stirred at 400 rpm for about 10 minutes. The resulting slurry was poured on 5C filter paper placed on a 330 mm diameter Nutsche with its bottom connected to a vacuum bottle, so that a zeolite cake was formed with a thickness of about 2 cm. Next, after 2,153 g of ascorbic acid was dissolved in 14,430 mL of water, 410 g of iron(II) sulfate heptahydrate was added thereto and dissolved to form an iron ion exchange solution (25° C.) with an adjusted iron(II) ion concentration of 0.1 mol/L. The solution was divided into four aliquots. One (3,607 mL) of the aliquots was poured on the zeolite cake and then removed from the bottom under vacuum. This process was repeated four times. The degree of vacuum was adjusted so that it took about 10 to 30 minutes to complete one removal process. Pure water was then poured on the zeolite cake to wash off the excess solute. The degree of cleanliness was monitored by measuring the pH and electrical conductivity of the washed-out solution, and the washing was continued until predetermined values (pH 7 and 40 μS/m) were reached. The cake was taken out and dried at 100° C. for 4 hours to give an iron(II)-substituted beta zeolite (fresh) of Example 3. The resulting iron(II)-substituted beta zeolite was subjected to composition analysis using the above method and found to have an Fe/Al molar ratio of 0.37, a Si/Al molar ratio of 4.84, an Fe content of 2.8% by mass, and an Al content of 3.8% by mass.

Comparative Example 3

A commercially-available copper-substituted CHA-type zeolite (Cu—CHA catalyst SSZ13) was used.

Comparative Example 4

A commercially-available iron-substituted beta zeolite (Fe—BEA catalyst) was used.

The SCR catalyst activities of the metal-substituted beta zeolites obtained in Examples 1 and 3 (in the as-produced), the metal-substituted beta zeolite obtained in Comparative Example 1 (in the as-produced), and the commercially-available metal-substituted zeolites of Comparative Examples 3 and 4 were measured using the method described below.

<SCR Catalyst Activity>

Figure 4:
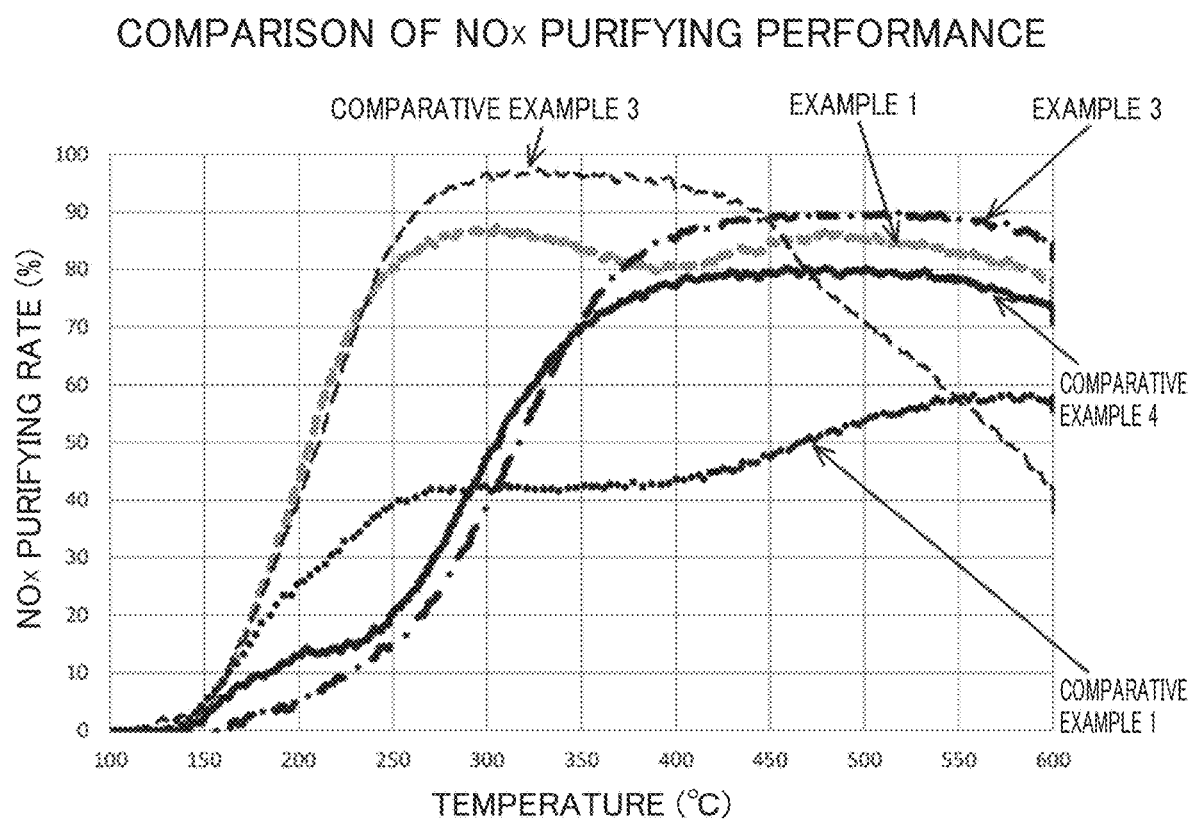
FIG. 4 is a graph showing the SCR catalyst activities of metal-substituted beta zeolites obtained in Examples and Comparative Examples.

Each zeolite to be evaluated was coated on a test piece to form a sample. A mixed gas of 10% by volume of $O_2$, 10% by volume of $H_2O$, and the remainder of $N_2$ was prepared and introduced into a furnace maintained at 700° C. Each zeolite sample was allowed to stand in the furnace for 20 hours so that it underwent hydrothermal durability test. The zeolite sample was then taken out and cooled to room temperature. The zeolite sample was charged into an atmospheric-pressure, fixed-bed, flow reactor tube. While a gas with the composition shown below was circulated under the condition of SV: 75,000 $h^{-1}$, the SCR catalyst activity was measured under the conditions of increasing the temperature from 100° C. to 600° C. at 20° C./min. Gas Composition: NO 200 ppm (by volume); $NH_3$ 200 ppm (by volume); $CO_2$ 10% by volume; $O_2$ 6% by volume; $H_2O$ 7% by volume; and $N_2$ balance. FIG. 4 shows the results of the measurement.

FIG. 4 shows that, among the copper-substituted zeolites, the beta zeolite of Example 1 has a high SCR catalyst activity in the low temperature range of 200 to 400° C. and also has a high SCR catalyst activity in the high temperature range of 400 to 600° C. In contrast, FIG. 4 shows that the copper-substituted beta zeolite of Comparative Example 1 has a low SCR catalyst activity in the low and high temperature ranges. In contrast to that of Example 1, the zeolite of Comparative Example 1 had a Bronsted acid site amount larger than its Lewis acid site amount and had a hexacoordinated-aluminum-derived peak observed in the NMR spectrum. FIG. 4 also shows that the commercially-available Cu-CHA zeolite of Comparative Example 3 has a low SCR catalyst activity in the high temperature range. FIG. 4 also shows that, among the iron-substituted zeolites, the iron-substituted beta zeolite of Example 3 has an SCR catalyst activity higher than that of the commercially-available iron-substituted beta zeolite of Comparative Example 4 in the high temperature range.

As described above, the metal-substituted beta zeolite of the present invention has a high SCR catalyst activity and thus is highly useful in industry. Particularly in a high-temperature range, conventional copper-substituted beta zeolites are known to have a catalytic activity lower than that of iron-substituted beta zeolites, although they have a higher catalytic activity in a low-temperature range. In contrast, the copper-substituted beta zeolite of the present invention has been found to have a high SCR catalyst activity at high temperatures despite its type. All conventional hydrothermally-resistant zeolites have high SAR and thus has a relatively small amount of exchanged copper ions. In contrast, the zeolite of the present invention has high a large amount of exchanged ions and a large amount of exchanged metal ions such as copper ions. This suggests high dynamic characteristics for SCR catalysts and shows high utility.

The invention claimed is:

1. A metal-substituted beta zeolite comprising a product produced by a process comprising: subjecting, to ion exchange with ammonium ions, a beta zeolite of an alkali metal type produced without using any organic structure-directing agent; and then subjecting the zeolite to ion exchange with copper or iron(II) ions by a filter cake method.

2. A metal-substituted beta zeolite having undergone ion exchange with copper ions and having a Lewis acid site amount larger than a Bronsted acid site amount when the Lewis acid site amount and the Bronsted acid site amount of the zeolite in an as-produced state are measured by an ammonia infrared-mass spectrometry/temperature-programmed desorption method.

3. The metal-substituted beta zeolite according to claim 1, which has undergone ion exchange with copper ions and has substantially no hexacoordinated-Al-derived peak observed when the zeolite is subjected to $^{27}$Al MAS NMR spectroscopy at 600 MHz.

4. The metal-substituted beta zeolite according to claim 1, which has an M/Al molar ratio of 0.3 or more and 1 or less, wherein M is Fe or Cu.

5. The metal-substituted beta zeolite according to claim 1, which has a total of Bronsted acid site amount and Lewis acid site amount of 0.5 mol or more and 3.5 mol or less per 1 kg of the metal-substituted beta zeolite when the Lewis acid site amount and the Bronsted acid site amount of the zeolite in an as-produced state are measured by an ammonia infrared-mass spectrometry/temperature-programmed desorption method after ion exchange with copper ions.

6. A method for producing a metal-substituted beta zeolite, comprising: exchanging alkali metal ions in a beta zeolite of an alkali metal type produced without using any organic structure-directing agent, with ammonium ions so that an ammonium-substituted beta zeolite is obtained; and allowing a copper ion- or iron(II) ion-containing aqueous solution to pass through a cake of the ammonium-substituted beta zeolite to exchange ammonium ions in the ammonium-substituted beta zeolite for copper or iron(II) ions.

7. The method for producing a metal-substituted beta zeolite according to claim 6, wherein the copper ion- or iron(II) ion-containing aqueous solution has a copper or iron(II) ion concentration of 0.3 mol/L or less.

8. The process for producing a metal-substituted beta zeolite according to claim 6, wherein the alkali metal ions in the alkali metal-substituted beta zeolite are exchanged for ammonium ions by allowing an ammonium ion-containing aqueous solution with a pH of 6.5 or more and 7.5 or less to pass through a cake of the alkali metal-substituted beta zeolite.

* * * * *